(12) United States Patent
Tamiya et al.

(10) Patent No.: US 7,034,948 B2
(45) Date of Patent: Apr. 25, 2006

(54) DISPLACEMENT PICKUP

(75) Inventors: Hideaki Tamiya, Kanagawa (JP);
Kayoko Taniguchi, Kanagawa (JP);
Akihiro Kuroda, Kanagawa (JP)

(73) Assignee: Sony Precision Technology, Tokyo (JP)

( * ) Notice: Subject to any disclaimer, the term of this patent is extended or adjusted under 35 U.S.C. 154(b) by 339 days.

(21) Appl. No.: 10/692,376

(22) Filed: Oct. 22, 2003

(65) Prior Publication Data
US 2004/0080755 A1    Apr. 29, 2004

(30) Foreign Application Priority Data
Oct. 23, 2002    (JP)    ............ P2002-308931

(51) Int. Cl.
*G01B 9/02*    (2006.01)

(52) U.S. Cl. ............ 356/499; 356/616; 250/231.16; 250/237 R

(58) Field of Classification Search ............ 356/494, 356/499, 615, 616, 617, 618; 250/231.16
See application file for complete search history.

(56) References Cited

U.S. PATENT DOCUMENTS 5,017,777 A * 5/1991 Ishizuka et al. ....... 250/231.16

5,717,488 A * 2/1998 Watanabe ............ 356/499

FOREIGN PATENT DOCUMENTS

JP        2-35248        8/1990

* cited by examiner

*Primary Examiner*—Gregory Toatley
*Assistant Examiner*—Marissa J Detschel
(74) *Attorney, Agent, or Firm*—Haverstock & Owens LLP

(57) ABSTRACT

A displacement pickup is provided which includes a displaceable scale (12) having defined therein a first area (12a) where positional information is recorded with a predetermined pitch and a second area (12b) where positional information is recorded with a predetermined pitch different from that in the first area (12a), a first reading system (10) to read the positional information recorded in the first area (12a), a first phase detector (14) to detect a first phase on the basis of the positional information read by the first reading system (10), a second reading system (11) to read the positional information recorded in the second area (12b), a second phase detector (15) to detect a second phase on the basis of the positional information read by the second reading system (11), a phase comparator (16) to make a comparison between the first and second phases, and an origin signal generator (17) to generate an origin signal according to the result of comparison from the phase comparator (16).

22 Claims, 5 Drawing Sheets

DISPLACEMENT PICKUP

BACKGROUND OF THE INVENTION

1. Field of the Invention

The present invention relates to a displacement pickup which picks up a displacement of a scale through the use of an optical interference.

This application claims the priority of the Japanese Patent Application No. 2002-308931 filed on Oct. 23, 2002, the entirety of which is incorporated by reference herein.

2. Description of the Related Art

Conventionally, a grating interferometer is used to pick up a displacement of gratings recorded on a moving scale through the use of an optical interference. A conventional displacement pickup will be described below with reference to FIG. 1. The displacement pickup is generally indicated with a reference number 4. It should be noted that the displacement pickup 4 in FIG. 1 uses a transmission grating.

As shown in FIG. 1, the displacement pickup 4 includes a coherent light source 90, first lens 91, first polarization beam splitter (PBS) 92, first quarter-wavelength plate 93, reflection prism 94, second quarter-wavelength plate 95, second lens 96, beam splitter (BS) 97, second PBS 98, first photoelectric transducer 99, second photoelectric transducer 100, third quarter-wavelength plate 101, third PBS 102, third photoelectric transducer 103, fourth photoelectric transducer 104, first differential amplifier 105, second differential amplifier 106 and an incremental signal generator 107. The displacement pickup 4 constructed as above reads transmission gratings recorded on a scale 108.

The coherent light source 90 emits a beam of light to the first lens 91. The first lens 91 converges the incident light beam into an appropriate light beam and lets the light beam travel to the first PBS 92. The first PBS 92 splits the incident light beam into two light components: an S-polarized light component and a P-polarized light component. It should be noted that the first PBS 92 reflects the light beam containing the P-polarized light component and allows the light beam containing the S-polarized light component to pass through. Also note that if the beam of light emitted from the coherent light source 90 is a plane-polarized light, it has the polarized direction thereof turned 45 deg. for incidence upon the first PBS 92. Thus, it is possible to equalize the intensity of the light beam containing the S-polarized light component with that of the light beam containing the P-polarized light component.

The light beam containing the S-polarized light component is incident upon a P point on the gratings recorded on the scale 108, while the light beam containing the P-polarized light component is incident upon a Q point on the gratings. They are diffracted in directions, respectively, given by the following formula:

$$\sin\theta_1 + \sin\theta_2 = n\cdot\lambda/\Lambda$$

where $\theta_1$ indicates an angle of incidence upon the scale 108, $\theta_2$ indicates an angle of diffraction from the scale 108, $\Lambda$ indicates a pitch (width) of the gratings, $\lambda$ indicates the wavelength of the light beam, and n indicates a diffraction order.

In the displacement pickup 4, such an adjustment is made that on the assumption that the angle of incidence upon the P point is $\theta_{1p}$, the angle of diffraction from the P point is $\theta_{2p}$, angle of incidence upon the Q point is $\theta_{1q}$ and angle of diffraction from the Q point is $\theta_{2q}$, $\theta_{1p} = \theta_{2p} = \theta_{1q}$ and $\theta_{2q}$. Also, the diffraction order is the same at the P and Q points.

The light beam diffracted at the P point passes through the first quarter-wavelength plate 93, is reflected vertically by the reflection prism 94 back to the P point, and is diffracted by the grating. At this time, the light beam having returned to the P point is a P-polarized light component since the optical axis of the first quarter-wavelength plate 93 is inclined 45 deg. in relation to the polarized direction of the incident light beam.

Similarly, the light beam diffracted at the Q point passes through the second quarter-wavelength plate 95, is reflected vertically by the reflection prism 94 back to the Q point, and is diffracted by the grating. At this time, the light beam having returned to the Q point is an S-polarized light component since the optical axis of the second quarter-wavelength plate 95 is inclined 45 deg. in relation to the polarized direction of the incident light beam.

The light beams having been diffracted again at of the P and Q points return to the first PBS 92. Since the light beam having returned from the P point contains the P-polarized light component, it is allowed by the first PBS 92 to pass through, while the light beam having returned from the Q point contains the S-polarized light component, it is reflected by the first PBS 92. Therefore, the light beams having returned from the P and Q points are superposed on each other in the first PBS 92 and incident upon the second lens 96. The superposed light beams are converged by the second lens 96 into an appropriate light beam and incident upon the BS 97. The BS 97 splits the incident light beam into two light components, of which one is incident upon the second PBS 98 and the other is incident upon the third quarter-wavelength plate 101. It should be noted that the second PBS 98 and third quarter-wavelength plate 101 are inclined 45 deg. in relation to the polarized direction of the incident light beam.

The second PBS 98 splits the incident light beam into two light beams: one containing S-polarized light component and the other containing P-polarized light component, and allows the light beam containing the S-polarized light component to pass through for incidence upon the first photoelectric transducer 99 while allowing the light beam containing the P-polarized light component to pass through for incidence upon the second photoelectric transducer 100. The first and second photoelectric transducers 99 and 100 produce interference signals of $A\cos(4Kx+\delta)$ where K indicates $2\pi/\Lambda$, x indicates a displacement, and $\delta$ indicates an initial phase. The first photoelectric transducer 99 produces an interference signal whose phase is shifted 180 deg. from that of an interference signal the second photoelectric transducer 100 produces.

Also, the third quarter-wavelength plate 101 produces, from the incident light beam, a circularly polarized light beam in which light beams containing P- and S-polarized light components, respectively, rotate in opposite directions and are superposed on each other to provide a plane-polarized light beam. This plane-polarized light beam is incident upon the third PBS 102. The third PBS 102 splits the incident plane-polarized light beam into a light beam containing S-polarized light component for incidence upon the third photoelectric transducer 103 and a light beam containing P-polarized light component for incidence upon the fourth photoelectric transducer 104. It should be noted that the polarized direction of the plane-polarized light beam incident upon the third PBS 102 rotates one turn when the diffraction gratings move $\Lambda/2$ in the direction of arrow x. Therefore, the third and fourth photoelectric transducers 103 and 104 can produce interference signals of Acos (4Kx+δ') similarly to the first and second photoelectric transducers 99 and 100.

The third photoelectric transducer 103 produces a signal whose phase is 180 deg. different from that of a signal produced by the fourth photoelectric transducer 104. It should be noted that the third PBS 102 is disposed at an angle of 45 deg. with respect to the second PBS 98 and therefore the signals produced by the third and fourth photoelectric transducers 103 and 104 are 90 deg. different in phase from signals produced by the first and second photoelectric transducers 99 and 100.

The first differential amplifier 105 makes a differential amplification of the electric signals supplied from the first and second photoelectric transducers 99 and 100 to produce a signal in which a DC (direct current) component of the interference signal has been canceled, and supplies it to the incremental signal generator 107. Also, the second differential amplifier 106 makes a similar differential amplification of the electric signals supplied from the third and fourth photoelectric transducers 103 and 104 to provide a signal of which a DC component of the interference signal has been canceled, and supplies it to the incremental signal generator 107.

The displacement pickup 4 constructed as above is featured in that even a Y-directional move of the diffraction gratings will not cause any error of the position measurement because its optical systems are formed symmetrical with respect to a perpendicular line A in FIG. 1. Also, it is featured in that with equalization of the optical path for incidence upon the P point in length with that for incidence upon the Q point, it is hardly influenced by the wavelength of the light source.

Reference Cited Herein:

1. Japanese Published Examined Patent No. 35248 of 1990

The aforementioned displacement pickup 4 is used in an X-ray lithography or precision machining for production of an integrated circuit. For accurate measurement of a position or distance, a reference point or origin has to be set in addition to an incremental signal. The displacement pickup 4 includes the scale 108 to detect an incremental signal and the scale 108 to detect an origin signal. The scales 108 are provided in separate tracks, respectively, and a reading mechanism is provided for each of the scales 108. On this account, the measurement is affected by an Abbe error and an error caused by a temperature drift and thus the displacement pickup 4 cannot detect an origin with a high precision. Particularly, the conventional displacement pickup 4 cannot repeatedly measure any origin with a stable accuracy which is on the order of nanometers (nm).

OBJECT AND SUMMARY OF THE INVENTION

It is therefore an object of the present invention to overcome the above-mentioned drawbacks of the related art by providing a displacement pickup capable of producing an incremental signal, and an origin signal whose accuracy is stable on the order of nanometers (nm).

The above object can be attained by providing a displacement pickup including:

a first reading means for emitting a beam of light to diffraction gratings and reading a return component of light from the diffraction gratings;

a first phase detecting means for detecting a first phase on the basis of the return component of light detected by the first reading means;

a second reading means for emitting a beam of light to diffraction gratings and reading a return component of light from the diffraction gratings;

a second phase detecting means for detecting a second phase on the basis of the return component of light detected by the second reading means;

a phase comparing means for making a comparison between the first and second phases;

an origin signal generating means for producing an origin signal on the basis of the result of comparison from the phase comparing means; and a scale having defined thereon a first area in which diffraction gratings are recorded with a predetermined pitch and from which the return component of light from the diffraction gratings is read by the first reading means, and a second area in which diffraction gratings are recorded with a predetermined pitch different from the diffraction grating pitch in the first area and from which the return component of light from the diffraction gratings is read by the second reading means, the scale being displaceable in a direction in which the return component of light from the diffraction gratings is read by the first and second reading means, the first and second areas being defined on the scale to be displaceable an equal distance in the same measuring direction; and a position for reading, by the first reading means, the positional information recorded in the first area and a position for reading, by the second reading means, the positional information recorded in the second area being in line with the measuring direction.

These objects and other objects, features and advantages of the present invention will become more apparent from the following detailed description of the preferred embodiments of the present invention when taken in conjunction with the accompanying drawings.

DETAILED DESCRIPTION OF THE PREFERRED EMBODIMENTS

Figure 1:
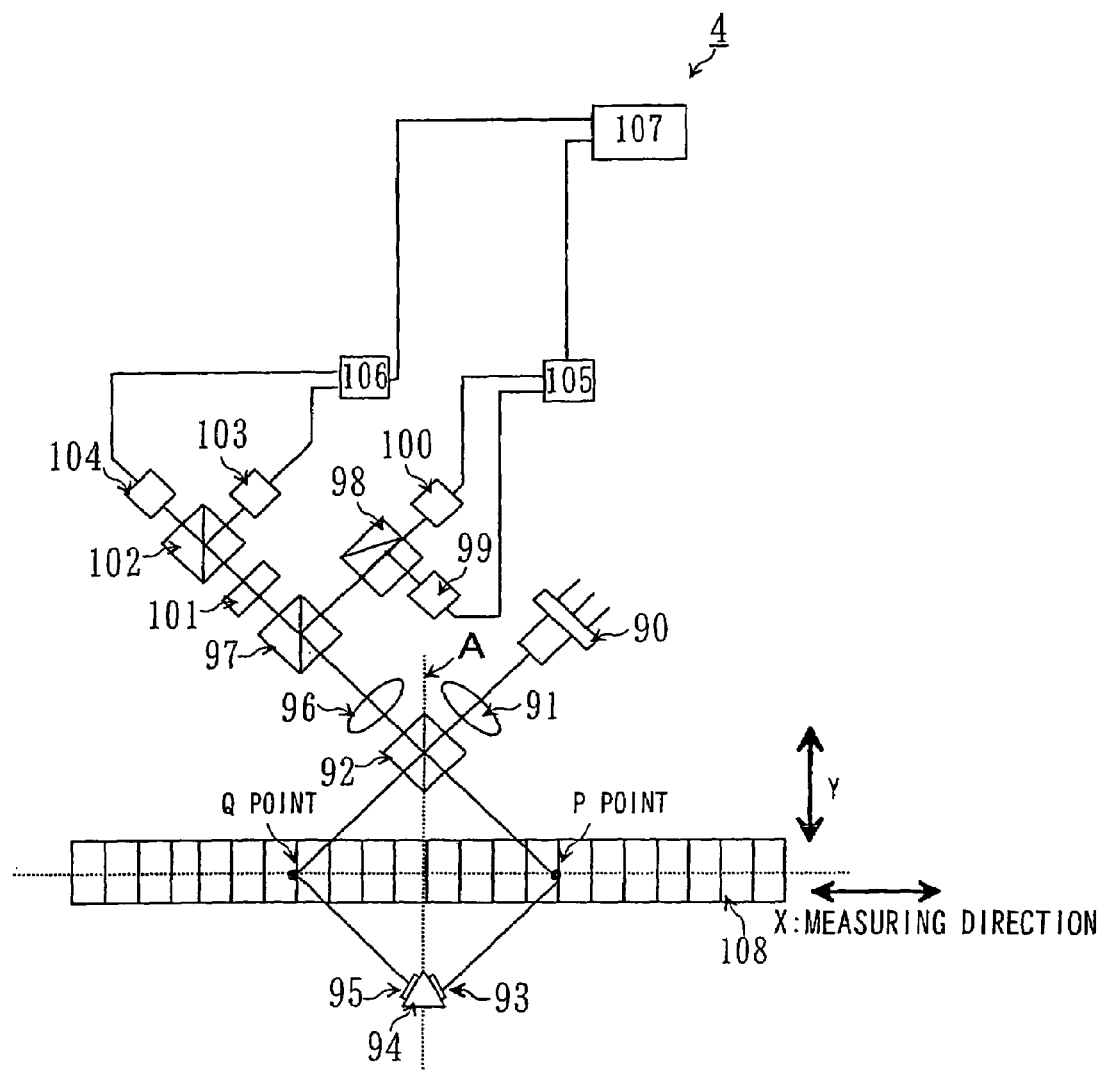
FIG. 1 is a block diagram of the conventional displacement pickup.
Figure 2:
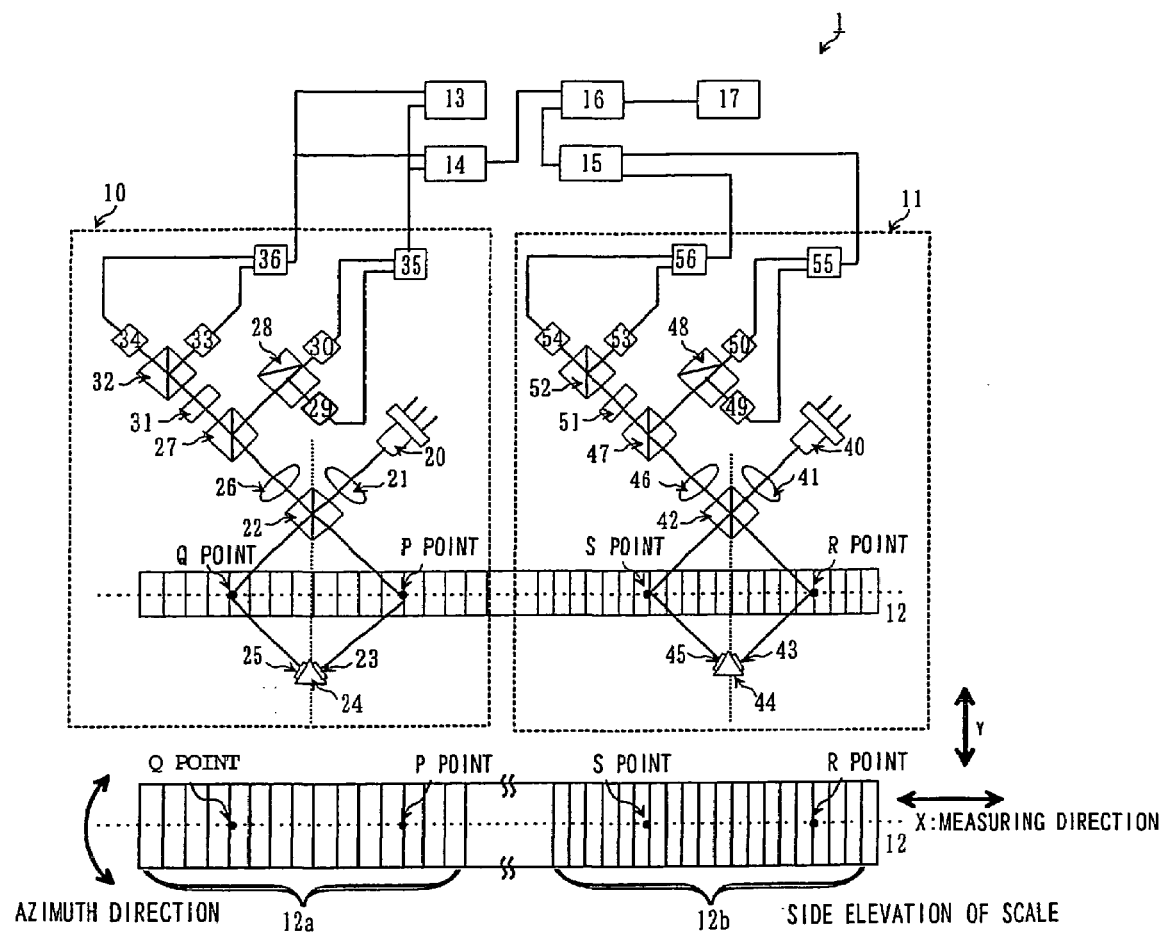
FIG. 2 is a block diagram of a first embodiment of the displacement pickup according to the present invention.

The embodiments of the displacement pickup according to the present invention will be described in detail below with reference to the accompanying drawings:

The present invention is applied to the displacement pickup, generally indicated with a reference number 1, as shown in FIG. 2 for example. As shown, the displacement pickup 1 includes a scale 12 having defined thereon a first area 12a in which diffraction gratings are recorded with a predetermined pitch and a second area 12b in which diffraction gratings are recorded with a predetermined pitch different from that in the first area, a first optical system 10 for reading a return component of a light beam incident upon the scale 12, a second optical system 11 for reading the return component of the light beam incident upon the scale 12, an incremental signal generator 13 to produce an incremental signal, a first phase detector 14 to detect a phase on the basis of the signal read from the first optical system 10, a second phase detector 15 to detect a phase on the basis of the signal read from the second optical system 11, a phase comparator 16 to make a comparison between the phase detected by the first phase detector 14 and that detected by the second phase detector 15, and a pulse signal generator 17 to produce a pulse signal on the basis of a signal output from the phase comparator 16.

As shown in FIG. 2, the first optical system 10 includes a coherent light source 20 to emit a beam of light, a first lens 21 to converge a beam of light emitted from the coherent light source 10, a first polarization beam splitter (PBS) 22 to split the light beam converged by the first lens into an S-polarized light component and a P-polarized light component, a first quarter-wavelength plate 23 to change the optical axis of the incident light beam, a reflection prism 24 to reflect an incident light beam, a second quarter-wavelength plate 25 to change the optical axis of an incident light beam, a second lens 26 to converge an incident light beam, a beam splitter (BS) 27 to divide an incident light beam in half, a second PBS 28 to split an incident light beam into an S-polarized light component and a P-polarized light component, a first photoelectric transducer 29 to convert an incident light beam into an electric signal, a second photoelectric transducer 30 to convert an incident light beam into an electric signal, a third quarter-wavelength plate 31 to change the optical axis of an incident light beam, a third PBS 32 to split an incident beam into an S-polarized light component and a P-polarized light component, a third photoelectric transducer 33 to convert an incident light beam into an electric signal, a fourth photoelectric transducer 34 to convert an incident light beam into an electric signal, a first differential amplifier 35 to make a differential amplification of the electric signals supplied from the first and second photoelectric transducers 29 and 30, and a second differential amplifier 36 to make a differential amplification of the electric signals supplied from the third and fourth photoelectric transducers 33 and 34. In this optical system 10, any one of the diffraction gratings recorded on the scale 12 is read, and the result of reading is supplied to the incremental signal generator 13 and first phase detector 14.

The scale 12 will be explained here. The scale 12 has defined at one side thereof with respect to a measuring direction the first area 12a in which the diffraction gratings are recorded with a pitch $\Lambda$, and at the other side the second area 12b where the diffraction gratings are recorded with a pitch $\Lambda+\Lambda/n$ (where n is an actual number other than zero). It should be noted that $\Lambda$ is 0.55 μm for example. In the scale 12, points of incidence (P and Q) upon the first area 12a and those (R) and S) upon the second area 12b are laid in line with the measuring direction. It should be noted that the first and second areas 12a and 12b may be defined on the same scale or on separate scales, respectively. In the latter case, the scales are fixed on the same pedestal to be equally displaceable in the same direction of displacement.

The coherent light source 20 emits a beam of light to the first lens 21. The first lens 21 converges the incident light beam appropriately and directs it to the first PBS 22. The first PBS 22 splits the incident light beam into two light components: an S-polarized one and P-polarized one. The first PBS 22 lets the light beam containing the S-polarized light component be incident upon the P point and light beam containing the P-polarized light component be incident upon the Q point so that the optical path up to the P point in the first area 12a of the scale 12 is centrosymmetric with the optical path up to the Q point. It should be noted that when the light beam from the coherent light source 20 is a plane-polarized light beam, the direction of polarization is inclined 45 deg. for incidence of the light beam upon the first PBS 22. Thereby it is possible to equalize the intensity of the S-polarized light component with that of the P-polarized light component.

Also, the light beams incident upon the P and Q points, respectively, are diffracted in directions, respectively, given by the following formula:

$$\sin \theta_1 + \sin \theta_2 = n \cdot \lambda / \Lambda$$

where $\theta_1$ indicates an angle of incidence upon the scale 12, $\theta_2$ indicates an angle of diffraction from the scale 12, $\Lambda$ indicates a pitch (width) of the gratings, $\lambda$ indicates the wavelength of the light beam, and n indicates a diffraction order.

In the displacement pickup 1, such an adjustment is made that on the assumption that the angle of incidence upon the P point is $\theta_{1p}$, the angle of diffraction from the P point is $\theta_{2p}$, angle of incidence upon the Q point is $\theta_{1q}$ and angle of diffraction from the Q point is $\theta_{2q}$, $\theta_{1p}=\theta_{1q}$ and $\theta_{2p}=\theta_{2q}$. Also, the diffraction order is the same at the P and Q points.

The light beam diffracted at the P point passes through the first quarter-wavelength plate 23, is reflected vertically by the reflection prism 24 back to the P point, and is diffracted by the diffraction grating. At this time, the light beam having returned to the P point is a P-polarized light component since the optical axis of the first quarter-wavelength plate 23 is inclined 45 deg. in relation to the polarized direction of the incident light beam.

Similarly, the light beam diffracted at the Q point passes through the second quarter-wavelength plate 25, is reflected vertically by the reflection prism 24 back to the Q point, and is diffracted by the grating. At this time, the light beam having returned to the Q point is an S-polarized light component since the optical axis of the second quarter-wavelength plate 25 is inclined 45 deg. in relation to the polarized direction of the incident light beam.

The light beams having been diffracted again at the P and Q points return to the first PBS 22.

Since the light beam having returned from the P point contains the P-polarized light component, it is allowed by the first PBS 22 to pass through, while the light beam having returned from the Q point is reflected by the first PBS 22 because it contains the S-polarized light component. Therefore, the light beams having returned from the P and Q points are superposed on each other in the first PBS 22 and incident upon the second lens 26.

The relation in length between an optical path up to the first quarter-wavelength plate 23 via the P point from the first PBS 22 and an optical path up to the second quarter-wavelength plate 25 via the Q point will be described here. It should be noted that in the displacement pickup 1, the optical path up to the first quarter-wavelength plate 23 via the P point is centrosymmteric with that up to the second quarter-wavelength plate 25 via the Q point.

For preventing any error caused by a variation in wavelength of the light source in this embodiment, the length of the optical path up to the first quarter-wavelength plate 23 via the P point, along which the light beam containing the S-polarized light component from the first PBS 22 travels, is adjusted to be equal to that of the optical path up to the second quarter-wavelength plate 25 via the Q point, along with the light beam containing the P-polarized light component from the first PBS 22. The accuracy of this adjustment depends on a necessary accuracy of length measurement and an ambient temperature at which the displacement pickup 1 is used. On the assumption that the necessary accuracy of length is ΔE, scale pitch is Λ, wavelength of the light source is λ and variation in wavelength due to a temperature variation is Δλ, the difference ΔL in length between the above optical paths has to meet the following formula:

$$\Delta E > \Delta\lambda/\lambda^2 \times 2 \times \Delta L \times \Lambda/4$$

On the assumption that the variation of the operating ambient temperature is 10° C. for example, the variation in wavelength of a generally used semiconductor laser of 780 nm in wavelength is about 3 nm. In this case, when the scale pitch Λ=0.55 μm and the necessary accuracy of length measurement ΔE is 0.1 μm, the difference ΔL in length between the above optical paths has to be smaller than 74 μm. For adjustment of the difference ΔL, a light source having an appropriate coherence length should be used.

Generally, the visibility representing a degree of modulation of the interference fringe in an interferometer depends upon the coherence of the light source and difference in length between two optical paths along which two light beams interfering with each other travel, respectively. It is well known that a light source having a good coherence such as a laser or the like which oscillates in a single mode will not lose the visibility even if there is a large difference in length between the optical paths, while with a light source having no good coherence, the visibility of the interference fringe will vary depending upon a variation in the difference in length between two optical paths.

Since with a light source having a good coherence as above, a difference in length between the two optical paths can be detected as a reduced degree of modulation (visibility) of an interference signal, so the optical paths can be made equal in length to each other through such an adjustment that the degree of modulation of the interference signal is maximum. For example, with a semiconductor laser of about 200 μm in coherence length and which oscillates in multiple modes, the difference ΔL in length between the optical paths can easily be set smaller than 74 μm.

Also, only for the above adjustment, the coherent light source 20 may be a light source whose coherence length is limited, and after the adjustment, it may be replaced with another inexpensive light source with a great coherence length (for example, a typical semiconductor laser which oscillates in a single mode).

The second lens 26 converges the incident beam of light for incidence upon the BS 27. The BS 27 divides the incident light beam in half, one of which is incident upon the second PBS 28 and the other is incident upon the third quarter-wavelength plate 31. It should be noted that the second PBS 28 and third quarter-wavelength plate 31 are at an angle of 45 deg. with respect to the polarized direction of the incident light beam.

The second PBS 28 splits the incident light beam into two light beams: one containing S-polarized light component and the other containing P-polarized light component, and allows the light beam containing the S-polarized light component to pass through for incidence upon the first photoelectric transducer 29 while allowing the light beam containing the P-polarized light component to pass through for incidence upon the second photoelectric transducer 30. The first and second photoelectric transducers 29 and 30 produce interference signals of Acos (4Kx+δ) where K indicates 2πw/Λ, x indicates a displacement, and δ indicates an initial phase. The first photoelectric transducer 29 produces an interference signal whose phase is shifted 180 deg. from that of an interference signal the second photoelectric transducer 30 produces.

Also, the third quarter-wavelength plate 31 produces, from the incident light beam, a circularly polarized light beam in which light beams containing P- and S-polarized light components, respectively, rotate in opposite directions and are superposed on each other to provide a plane-polarized light beam. This plane-polarized light beam is incident upon the third PBS 32. The third PBS 32 splits the incident plane-polarized light beam into a light beam containing S-polarized light component for incidence upon the third photoelectric transducer 33 and a light beam containing P-polarized light component for incidence upon the fourth photoelectric transducer 34. It should be noted that the polarized direction of the plane-polarized light beam incident upon the third PBS 32 rotates one turn when the diffraction gratings move Λ/2 in the direction of arrow x. Therefore, the third and fourth photoelectric transducers 33 and 34 can produce interference signals of Acos (4Kx+δ') similarly to the first and second photoelectric transducers 29 and 30.

The third photoelectric transducer 33 produces a signal whose phase is 180 deg. different from that of a signal produced by the fourth photoelectric transducer 34. It should be noted that the third PBS 32 is disposed at an angle of 45 deg. with respect to the second PBS 28. Therefore, the signals produced by the third and fourth photoelectric transducers 33 and 34 are 90 deg. different in phase from signals produced by the first and second photoelectric transducers 29 and 30.

The first differential amplifier 35 makes a differential amplification of the electric signals supplied from the first and second photoelectric transducers 29 and 30 to produce a signal in which a DC (direct current) component of the interference signal has been canceled, and supplies it to the incremental signal generator 13 and first phase detector 14. Also, the second differential amplifier 36 makes a similar differential amplification of the electric signals supplied from the third and fourth photoelectric transducers 33 and 34 to provide a signal of which a DC component of the interference signal has been canceled, and supplies it to the incremental signal generator 13 and first phase detector 14.

Figure 3:
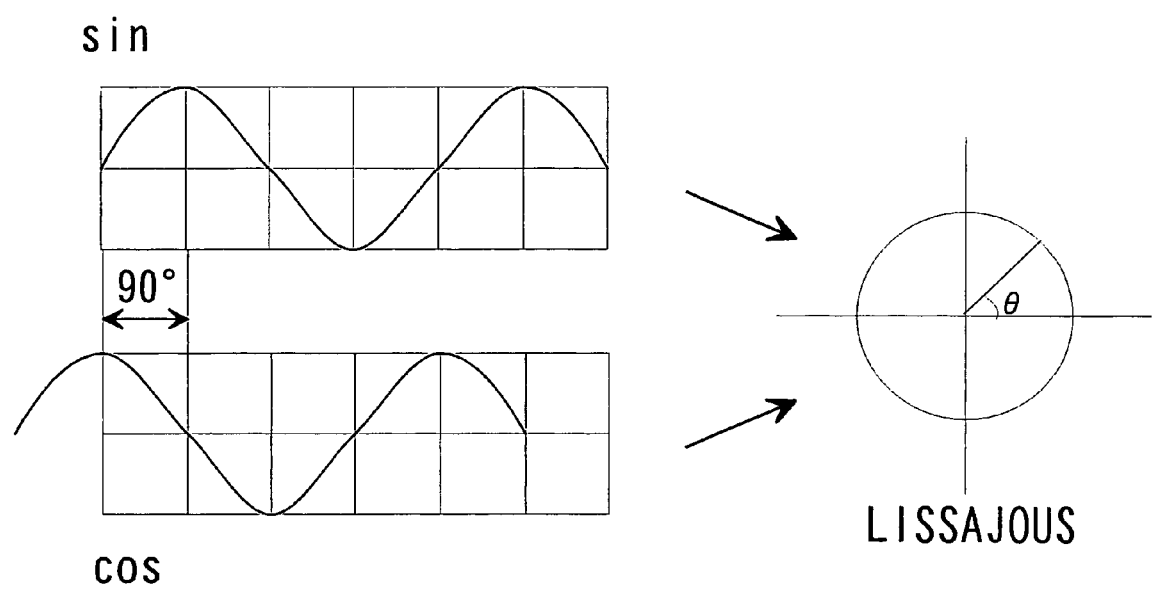
FIG. 3 shows the angle of a Lissajous signal produced by the displacement pickup in FIG. 2.

The incremental signal generator 13 determines a displaced direction and extent of the scale on the basis of the signals supplied from the first and second differential amplifiers 35 and 36 to produce an incremental signal. The first phase detector 14 determines an angle $\theta_a$ of a Lissajous signal as shown in FIG. 3, and supplies it to the phase comparator 16.

As shown in FIG. 2, the second optical system 11 includes a coherent light source 40, first lens 41, first polarized beam splitter (PBS) 42, first quarter-wavelength plate 43, reflection prism 44, second quarter-wavelength plate 45, second lens 46, beam splitter (BS) 47, second PBS 48, first photoelectric transducer 49, second photoelectric transducer 50, third quarter-wavelength plate 51, third PBS 52, third photoelectric transducer 53, fourth photoelectric transducer 54, first differential amplifier 55 and a second differential amplifier 56. In this second optical system 11, any one of the diffraction gratings recorded on the scale 12 is read, and the result of reading is supplied to the second phase detector 15. It should be noted that since the second optical system 11 operates similarly to the aforementioned first optical system 10, so the operation of each component will not be explained herein.

Similarly to the first phase detector 14, the second phase detector 15 determines an angle $\theta_b$ of a Lissajous signal on the basis of signals supplied from the first and second differential amplifiers 55 and 56, and supplies it to the phase comparator 16.

The phase comparator 16 functions as will be described below. In the first phase detector 14, when the scale 12 displaces $\Lambda/4$ in a predetermined measuring direction, the angle $\theta_a$ of the Lissajous signal rotates one turn. In the second phase detector 15, when the scale 12 displaces $(\Lambda+\Lambda/n)/4$ in a predetermined measuring direction, the angle $\theta_b$ of the Lissajous signal rotates one turn.

The phase comparator 16 determines a difference $\Delta\theta$ ($\Delta\theta=\theta_a-\theta_b$) between the angle $\theta_a$ of the Lissajous signal supplied from the first phase detector 14 and the angle $\theta_b$ of the Lissajous signal supplied from the second phase detector 15. The difference $\Delta\theta$ varies as the scale 12 is displaced, and will assume the initial value again when the scale 12 is displaced $\Lambda(1+n)/4$ in a predetermined measuring direction.

The phase comparator 16 supplies the difference $\Delta\theta$ to the pulse signal generator 17. When the difference $\Delta\theta$ has a predetermined value difference $\Delta\theta_c$, the pulse signal generator 17 produces a pulse signal. For example, in case the difference $\Delta\theta$ has the initial value each time the scale 12 is displaced $\Lambda(1+n)/4$ in the predetermined measuring direction, the pulse signal generator 17 will produce a pulse signal at every $\Lambda(1+n)/4$.

Also, the pulse signal generator 17 can arbitrarily set the above value $\Delta\theta_c$ (will be referred to as "setting" hereinafter). Having made a setting of zero degree which can easily be detected, for example, the pulse signal generator 17 will generate a pulse signal when the difference $\Delta\theta$ supplied from the phase comparator 16 is zero degree.

Further, since the pulse signal generator 17 generates a pulse signal at a predetermined interval unless the distance between the first and second optical systems 10 and 11 and the distance between the first and second areas 12a and 12b on the scale 12 vary, it will be able to use the pulse signal as an origin signal. Also, the interval at which the origin signal is produced can be set arbitrarily according to a difference $\Lambda/n$ between a pitch of the diffraction gratings recording in the first area 12a and a pitch of the diffraction gratings recorded in the second area 12b.

The resolution of the pulse signal produced by the pulse signal generator 17 will be discussed below. Since the period of the pulse signal should be longer for use of the pulse signal as an origin signal, the value n should be larger.

However, since the phase difference is only $\Lambda/4n$ at a point the Lissajous has made one round from a point where two phase differences coincide with each other, a detected position will be $\Lambda/4$ off the correct position if the coincidence cannot be detected with a better accuracy than $\Lambda/4n$. The resolution of detecting two phase differences depends upon an accuracy of reading the two phase differences and a signal-to-noise (S/N) ratio, which will result in a limitation of the magnitude of the value n.

On the assumption that in the displacement pickup 1, the grating pitch is 0.55 μm and n is 100, for example, the origin of repetition will appear about every 13.9 μm. At this time, when the resolution is $\Lambda/4n$, the value n has at least 200 to 400. Namely, the resolution should be as high as possible. For example, when n=100, the phase difference is only $2\pi/100$ even with a displacement of $\Lambda/4$, and so the resolution with which the phase difference is within the resolution margin will have a margin of $\Lambda/4$. To reduce this margin, the resolution has to be increased. In case n=1000, the distance margin will be $\Lambda/(4\times10)$.

However, the resolution cannot easily be increased because of the S/N ratio. On this account, it will be an effective measure to select, as a gate, one waveform ($\Lambda/4$) of a signal with which the coincidence between phase differences is detected, and produce an origin signal when the phase of one signal form which the margin of $\Lambda/4$ is determined is a predetermined one. Thereby, the origin accuracy and resolution can be increased up to a phase difference detecting resolution. It should be noted that in this embodiment, the origin accuracy can be increased up to 0.3 to 0.7 nm.

Also, the pulse signal generator 17 may be designed so that the user can change the setting after the displacement pickup 1 is installed to an object apparatus. It should be noted that in this case, the setting may initially be an appropriate one and a program for changing the setting is distributed to the user upon inquiry from the user.

Also, the pulse signal generator 17 may be designed to count times when the difference $\Delta\theta$ supplied from the phase comparator 16 has arrived at the setting and produce a pulse signal when the count of times has taken a predetermined value.

Further the pulse signal generator 17 may be adapted to produce an origin signal when the angle $\theta_a$ of a Lissajous signal produced by the first phase detector 14 (will be referred to as "angle $\theta_a$" hereinafter), or the angle $\theta_b$ of a Lissajous signal produced by the second phase detector 15 (will be referred to as "angle $\theta_b$" hereinafter), arrives at an arbitrary angle $\theta_n$ after the difference $\Delta\theta$ has arrived at the setting. Also, the pulse signal generator 17 may be designed to produce an origin signal when the angle $\theta_a$ or $\theta_b$ arrives at an arbitrary angle $\theta_n$ reappearing in a position a predetermined distance apart from a position where it has arrived at the arbitrary angle $\theta_n$ once after arrival of the difference $\Delta\theta$ at the setting. It should be noted that the predetermined distance is $(2n+1)\Lambda/2$ where n is an integer larger than zero and $\Lambda$ is a pitch with which the diffraction gratings are recorded in the first area 12a in case the pulse signal generator 17 is to use the first area 12a for production of an origin signal or a pitch with which the diffraction gratings are recorded in the second area 12b in case the pulse signal generator 17 is to use the second area 12b for production of an origin signal.

Note that the pulse signal generator 17 may be designed so that the user can change the arbitrary angle $\theta_n$ after the displacement pickup 1 is installed to an object apparatus. In this case, the arbitrary angle $\theta_n$ may initially be an appropriate one and a program for changing the arbitrary angle $\theta_n$ is distributed to the user upon inquiry from the user.

In displacement pickup 1 constructed as above, the scale 12 has formed on one side thereof with respect to a measuring direction the first area 12a where the diffraction gratings are recorded with the pitch $\Lambda$ and on the other side the second area 12b where the diffraction gratings are recorded with the pitch $\Lambda+\Lambda/n$. The first and second optical systems 10 and 11 emits beams of light centrosymmetrically to the scale 12 so that the incident light beams are diffracted at points disposed in line with each other on the diffraction gratings. The light beams thus diffracted by the diffraction gratings interfere with each other. Each of the first and second phase detectors 14 and 15 detects a phase difference between the light beams interfering with each other, and the phase comparator 16 detects a difference between the phase differences, and the pulse signal generator 17 produces a pulse when the difference takes the predetermined value. Thus, upon detection of an incremental signal by the incremental signal generator 13, the pulse signal generator 17 can produce an accurate origin signal without being influenced by any Abbe error.

Also, in the displacement pickup 1, the first and second optical systems 10 and 11 have the optical paths thereof disposed centrosymmetrically, and the optical path differences equal to each other for the light beams interfering with each other. Thus, even with the scale 12 displaced in the Y direction and the wavelength of the light source being caused to vary by an external temperature, no travel error takes place. So, a stable origin signal can always be produced.

Further, since the first and second optical systems 10 and 11 used in the displacement pickup 1 according to the present invention are of a grating interferometer type, so the diffraction gratings can be recorded with smaller pitches in the first and seconds areas 12a and 12b, respectively, defined on the scale 12. For example, when the grating pitch is 0.55 µm, the signal for detection of a phase will have a period of 0.1379 ... µm (about 138 nm). Thus, it is possible to detect a phase difference with a high accuracy which is on the order of nanometers, for example.

Also, in the displacement pickup 1, the coherent light source 20 and first lens 21 and the second lens 26 and BS 27 in the first optical system 10, and the coherent light source 40 and first lens 41 and the second lens 46 and BS 47 in the second optical system 11, may be connected to each other with optical fibers, respectively.

Alternatively, instead of making a connection between the second lens 26 and BS 27 and between the second lens 46 and BS 47 with the optical fibers, respectively, the second PBS 28 and first photoelectric transducer 29, the second PBS 28 and second photoelectric transducer 30, the third PBS 32 and third photoelectric transducer 33, the third PBS 32 and fourth photoelectric transducer 34, the second PBS 48 and first photoelectric transducer 49, the second PBS 48 and second photoelectric transducer 50, the third PBS 52 and third photoelectric transducer 53, and the third PBS 52 and fourth photoelectric transducer 54, may be connected to each other with optical fibers, respectively.

Note that to condense the output light from the second PBS 28 for supply to the optical fiber, a condenser lens may be disposed between the second PBS 28 and first photoelectric transducer 29 and between the second PBS 28 and second photoelectric transducer 30, respectively; to condense the output light from the third PBS 32 for supply to the optical fiber, a condenser lens may be disposed between the third PBS 32 and third photoelectric transducer 33 and between the third PBS 32 and fourth photoelectric transducer 34, respectively; to condense the light output from the second PBS 48 for supply to the optical fiber, a condenser lens may be disposed between the second PBS 48 and first photoelectric transducer 49 and between the second PBS 48 and second photoelectric transducer 50, respectively; and to condense the output light from the third PBS 52 for supply to the optical fiber, a condenser lens may be disposed between the third PBS 52 and third photoelectric transducer 53 and between the third PBS 52 and fourth photoelectric transducer 54, respectively.

In the aforementioned construction of the displacement pickup 1, the scale 12 can be disposed apart from any heat source, so that the phase detection can be done more stably. Also, the wavelength of beams of light emitted from the coherent light sources 20 and 40 can be fixed to a constant one through a temperature control. Further, with the coherent light sources 20 and 40 disposed outside the displacement pickup 1, they can readily be replaced when they get faulty.

Note that in the displacement pickup 1, the difference in optical path length may be monitored on the basis of the result of detection of a degree of modulation when the interference lights are made to interfere with each other in the first and second optical systems 10 and 11. If the result of monitoring shows a difference in the optical path length, the optical paths are adjusted to have an equal.

Figure 4:
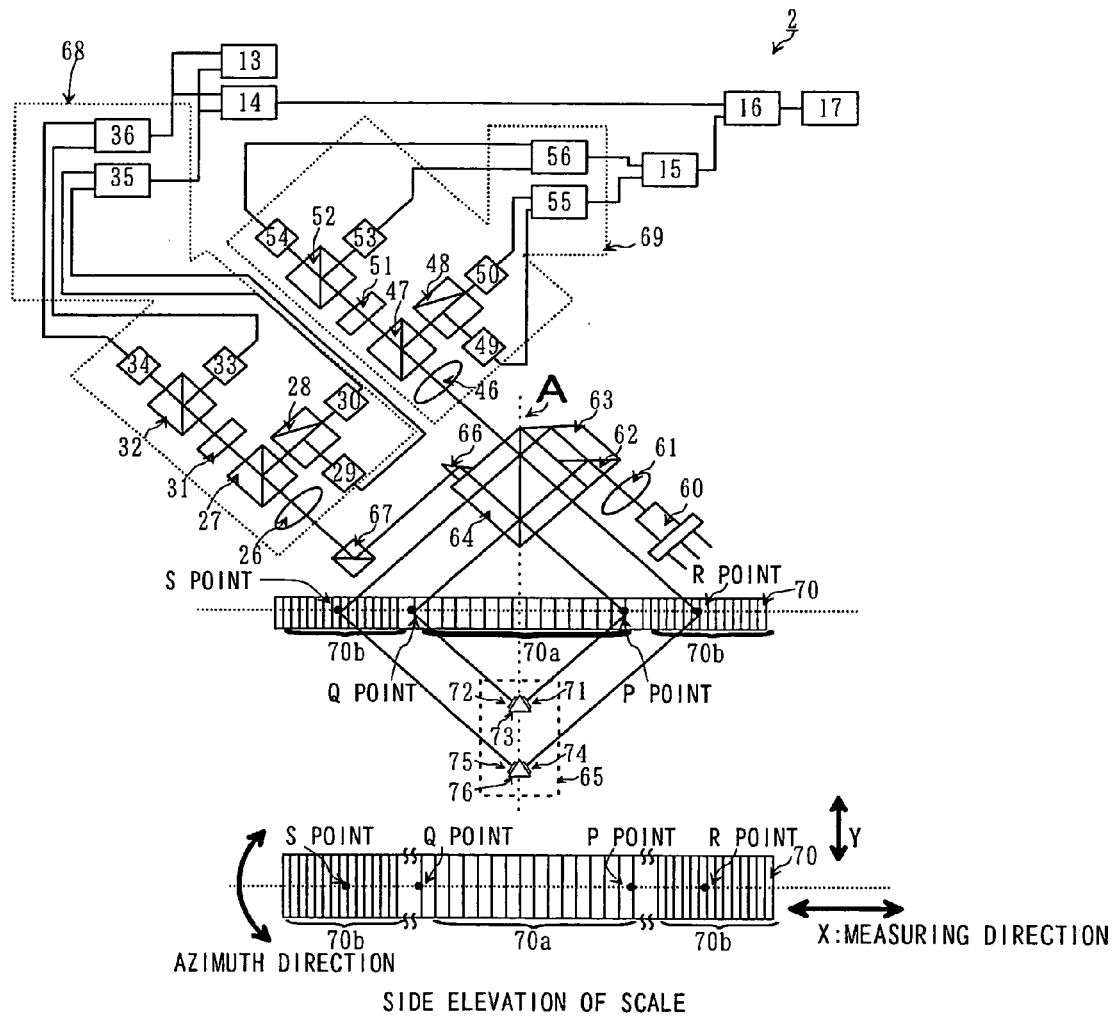
FIG. 4 is a block diagram of a second embodiment of the displacement pickup according to the present invention.

FIG. 4 shows the second embodiment of the displacement pickup according to the present invention. The displacement pickup is generally indicated with a reference number 2. It should be noted that the same as or similar elements to those in the aforementioned displacement pickup 1 are indicated with the same as or similar reference numbers to those for the elements in the displacement pickup 1 and will not be described in detail.

In the displacement pickup 2, a light source and light branching unit are used in common by detection optical systems. The displacement pickup 2 includes a light source 60 to emit a coherent beam of light, a lens 61 to converge the light beam emitted from the coherent light source 60, a beam splitter (BS) 62 to divide the incident light beam from the lens 61 in half, a first total reflection mirror 63 to reflect the incident light beam totally, a polarization beam splitter (PBS) 64 to split the incident light beam into a light beam containing an S-polarized component and a light beam containing a P-polarized component, a reflector 65 to reflect the incident light beam, a second total reflection mirror 66 to reflect the incident light beam totally, a third total reflection mirror 67 to reflect the incident light beam totally, a first optical system 68 to read a return component of the incident light beam upon a scale 70 having defined thereon a first area 70a where diffraction gratings are recorded with a predetermined pitch and second areas 70b where diffraction gratings are recorded with a pitch different from that in the first area, a second optical system 69 to read a return component of the incident light beam upon the scale 70, an incremental signal generator 13 to produce an incremental signal on the basis of a signal supplied from the first optical system 68, a first phase detector 14 to detect a phase on the basis of a signal read from the first optical system 68, a second phase detector 15 to detect a phase on the basis of a signal read from the second optical system 69, a phase comparator 16 to make a comparison between the phases detected by the first and second phase detectors 14 and 15, respectively, and a pulse signal generator 17 to produce a pulse signal on the basis of a signal output from the phase comparator 16. The reflector 65 includes a first quarter-wavelength plate 71 to change the optical axis of an incident light beam, a second quarter-wavelength plate 72 to change the optical axis of an incident light beam, a first reflection prism 73 to reflect an incident light beam, a third quarter-wavelength plate 74 to change the optical axis of an incident light beam, a fourth quarter-wavelength plate 75 to change the optical axis of an incident light beam, and a second reflection prism 76 to reflect an incident light beam.

The scale 70 has defined thereon the first area 70a where diffraction gratings are recorded with a pitch $\Lambda$ and the second area 70b where diffraction gratings recorded thereon with a pitch $\Lambda+\Lambda/n$ (where n is an actual number other than zero). The second areas 70b are defined on either side of the first area 70a. The pitch $\Lambda$ is 0.55 µm, for example. In the scale 70, points of incidence (P and Q) upon the first area 70a and those (Ⓡ and S) upon the second area. 70b are laid in line with the measuring direction. It should be noted that the first and second areas 70*a* and 70*b* may be defined on the same scale or on separate scales, respectively. In the latter case, the scales are fixed on the same pedestal to be equally displaceable in the same direction of displacement.

Also, in the displacement pickup 2, such an adjustment is made that on the assumption that the angle of incidence upon the P point is $\theta_{1p}$, the angle of diffraction from the P point is $\theta_{2p}$, angle of incidence upon the Q point is $\theta_{1q}$ and angle of diffraction from the Q point is $\theta_{2q}$, $\theta_{1p}=\theta_{1q}$ and $\theta_{2p}=\theta_{2q}$. Further, on the assumption that the angle of incidence upon the R point is $\theta_{1r}$, the angle of diffraction from the P point is $\theta_{2r}$, angle of incidence upon the Q point is $\theta_{1s}$ and angle of diffraction from the Q point is $\theta_{2s}$, $\theta_{1r}=\theta_{1s}$ and $\theta_{2r}=\theta_{2s}$. Also, the diffraction order is the same at the P, Q, R and S points and the diffraction order used in the displacement pickup 2 is the first order.

The coherent light source 60 emits a beam of light to the lens 61. The lens 61 converges the incident light beam to an appropriate extent, and lets it be incident upon the BS 62. The BS 62 splits the incident light beam into two beams of light, of which the one is incident upon the first total reflection mirror 63 while the other is incident upon the PBS 64.

The PBS 64 splits the incident light beam into a light beam containing an S-polarized component and a P-polarized component. The PBS 64 allows the light beam containing the S-polarized component to be incident upon the P point and the light beam containing the P-polarized component to be incident upon the Q point so that the optical path up to the P point in the first area 70*a* on the scale 70 and that up to the Q point in the second area 70*b* are centrosymmetric with each other. It should be noted that when the light from the coherent light source 60 is a plane-polarized one, the polarized direction is inclined 45 deg. for incidence upon the PBS 64. Thus, the light beam containing the S-polarized component and that containing the P-polarized component can be made equal in intensity to each other.

Also, the light beams incident upon the P and Q points are diffracted in directions, respectively, given by the following formula:

$$\sin \theta_1 + \sin \theta_2 = n \cdot \lambda / \Lambda$$

where $\theta_1$ indicates an angle of incidence upon the scale 70, $\theta_2$ indicates an angle of diffraction from the scale 70, $\Lambda$ indicates a pitch (width) of the gratings, $\lambda$ indicates the wavelength of the light beam, and n indicates a diffraction order.

The light beam diffracted at the P point passes through the first quarter-wavelength plate 71, is reflected vertically by the first reflection prism 73 back to the P point, and diffracted by the diffraction gratings. At this time, the light beam back to the P point is a light beam containing a P-polarized component because the optical axis of the first quarter-wavelength plate 71 is inclined 45 deg. in relation to the polarized direction of the incident light beam.

Also, the light beam diffracted at the Q point passes through the second quarter-wavelength plate 72, is reflected vertically by the first reflection prism 73 back to the Q point, and diffracted by the diffraction gratings. At this time, the light beam back to the Q point is a light beam containing an S-polarized component because the optical axis of the second quarter-wavelength plate 72 is inclined 45 deg. in relation to the polarized direction of the incident light beam.

The light beams diffracted at the P and Q points come back to the PBS 64 as above. The PBS 64 allows the light beam from the P point to pass through since it contains the P-polarized component while reflecting the light from the Q point since it contains the S-polarized component. Therefore, the light beams coming back from the P and Q points are superposed on each other in the PBS 64 and incident upon the first optical system 68 via the second and third total reflection mirrors 66 and 67.

The first optical system 68 is a version of the first optical system 10 included in the aforementioned displacement pickup 1 and in which the coherent light source 20, first lens 21 and first PBS 22 are not included. The first optical system 68 is constructed and works similarly to the first optical system 10.

On the other hand, the light beam having passed through the BS 62 is reflected by the first total reflection mirror 63 for incidence upon the PBS 64.

The PBS 64 splits the incident light beam into a light beam containing an S-polarized component and a P-polarized component. The PBS 64 allows the light beam containing the S-polarized component to be incident upon the R point and the light beam containing the P-polarized component to be incident upon the S point so that the optical path up to the R point in the first area 70*a* on the scale 70 and that up to the S point in the second area 70*b* are centrosymmetric with each other. It should be noted that when the light from the coherent light source 60 is a plane-polarized one, the polarized direction is inclined 45 deg. for incidence upon the PBS 64. Thus, the light beam containing the S-polarized component and that containing the P-polarized component can be made equal in intensity to each other.

Also, the light beams incident upon the R and S points are diffracted in directions, respectively, given by the following formula:

$$\sin \theta_1 + \sin \theta_2 = n \cdot \lambda / \Lambda$$

where $\theta_1$ indicates an angle of incidence upon the scale 70, $\theta_2$ indicates an angle of diffraction from the scale 70, $\Lambda$ indicates a pitch (width) of the gratings, $\lambda$ indicates the wavelength of the light beam, and n indicates a diffraction order.

The light beam diffracted at the R point passes through the third quarter-wavelength plate 74, is reflected vertically by the second reflection prism 76 back to the R point, and diffracted by the diffraction gratings. At this time, the light beam back to the R point is a light beam containing a P-polarized component because the optical axis of the third quarter-wavelength plate 74 is inclined 45 deg. in relation to the polarized direction of the incident light beam.

Also, the light beam diffracted at the S point passes through the fourth quarter-wavelength plate 75, is reflected vertically by the second reflection prism 76 back to the S point, and diffracted by the diffraction gratings. At this time, the light beam back to the S point is a light beam containing an S-polarized component because the optical axis of the fourth quarter-wavelength plate 75 is inclined 45 deg. in relation to the polarized direction of the incident light beam.

The light beams diffracted at the R and S points come back to the PBS 64 as above. The PBS 64 allows the light beam from the R point to pass through since it contains the P-polarized component while reflecting the light from the S point since it contains the S-polarized component. Therefore, the light beams coming back from the R and S points are superposed on each other in the PBS 64 and incident upon the second optical system 69.

The second optical system 69 is a version of the second optical system 11 included in the aforementioned displacement pickup 1 and in which the coherent light source 40, first lens 41 and first PBS 42 are not included. The first optical system 68 is constructed and works similarly to the second optical system 11.

Also, since the incremental signal generator 13, first phase detector 14, second detector 15, phase comparator 16 and pulse signal generator 17 are constructed and work similarly to those included in the aforementioned displacement pickup 1, the pulse signal generator 17 can produce a pulse signal at every $\Lambda(1+n)/4$, for example, and use the pulse signal as an origin signal.

Also, the interval at which the origin signal is produced can be set arbitrarily according to a difference $\Lambda/n$ between the pitch with which the diffraction gratings are recorded in the first area 70a and that with which the diffraction gratings are recorded in the second area 70b.

In displacement pickup 2 constructed as above, a beam of light emitted from the coherent light source 60 is split by the PBS 64 for incidence upon the scale 70 having defined vertically thereon the first area 70a where the diffraction gratings are recorded with the pitch $\Lambda$ and the second area 70b where the diffraction gratings are recorded with the pitch $\Lambda+\Lambda/n$ (n is an actual number other than zero), so that the split beams of light are centrosymmetric with each other. The light beams diffracted at points of diffraction disposed in line with each other interfere with each other in the first and second optical systems 68 and 69. Each of the first and second phase detectors 14 and 15 detects a phase difference between the light beams interfering with each other, and the phase comparator 16 detects a difference between the phase differences, and the pulse signal generator 17 produces a pulse when the difference takes a predetermined value. Thus, upon detection of an incremental signal by the incremental signal generator 13, the pulse signal generator 17 can produce an accurate origin signal without being influenced by any Abbe error.

Also, in the displacement pickup 2, since the optical path through the P point in the first area 70a on the scale 70 is symmetric to the optical path through the Q point with respect to the perpendicular line A, and the optical path through the R point in the second area 70b is symmetric to the optical path through the S point with respect to the perpendicular line A, so a displacement of the scale 70 in the Y direction will not cause any travel error and a stable origin signal can always be produced. Also, in the displacement pickup 2, since the optical path for incidence upon the P point in the first area 70a on the scale 70 and that for incidence upon the Q point are adjusted to have an equal length and also the optical path for incidence upon the R point in the second area 70b and that for incidence upon the S point are adjusted to have an equal length, so a variation of the wavelength of the light source due to an external temperature will not cause any travel error and thus a stable origin signal can be produced.

Further in the displacement pickup 2, since the first and second optical systems 68 and 69 are of a grating interferometer type, so the diffraction gratings can be recorded with smaller pitches in the first and second areas 70a and 70b, respectively, defined on the scale 70. For example, when the grating pitch is 0.55 μm, the signal for detection of a phase will have a period of 0.1379 . . . μm (about 138 nm). Thus, it is possible to detect a phase difference with a high accuracy which is on the order of nanometers, for example.

Also in the displacement pickup 2, since the coherent light source 60 and PBS 64 are used in common by the first and second optical systems 68 and 69, so a variation of the light emitted from the coherent light source 60 over time or due to a change of the external temperature will not influence the symmetry of the light paths and thus a stable origin signal can be produced. Further in the displacement pickup 2, even if the scale 70 is rotated in the azimuth direction, the position of an origin will not be drifted by a COS error.

Also, the coherent light source 60 and lens 61, the second lens 26 and BS 27, and the second lens 46 and BS 47, may be connected to each other with optical fibers, respectively.

Alternatively, instead of making a connection between the second lens 26 and BS 27 and between the second lens 46 and BS 47 with the optical fibers, respectively, the second PBS 28 and first photoelectric transducer 29, the second PBS 28 and second photoelectric transducer 30, the third PBS 32 and third photoelectric transducer 33, the third PBS 32 and fourth photoelectric transducer 34, the second PBS 48 and first photoelectric transducer 49, the second PBS 48 and second photoelectric transducer 50, the third PBS 52 and third photoelectric transducer 53, and the third PBS 52 and fourth photoelectric transducer 54, may be connected to each other with the optical fibers, respectively.

Note that to condense the output light from the second PBS 28 for supply to the optical fiber, a condenser lens may be disposed between the second PBS 28 and first photoelectric transducers 29 and between the second PBS 28 and second photoelectric transducer 30, respectively; to condense the output light from the third PBS 32 for supply to the optical fiber, a condenser lens may be disposed between the third PBS 32 and third and third photoelectric transducer 33 and between the third PBS 32 and fourth photoelectric transducer 34, respectively; to condense the light output from the second PBS 48 for supply to the optical fiber, a condenser lens be disposed between the second PBS 48 and first photoelectric transducer 49 and between the second PBS 48 and second photoelectric transducer 50, respectively; and to condense the output light from the third PBS 52 for supply to the optical fiber, a condenser lens be disposed between the third PBS 52 and third photoelectric transducer 53 and between the third PBS 52 and fourth photoelectric transducer 54, respectively.

In the aforementioned construction of the displacement pickup 2, the scale 70 can be disposed apart from any heat source, so that the phase detection can be done more stably. Also, the wavelength of beams of light emitted from the coherent light source 60 can be fixed to a constant one through a temperature control. Further, with the coherent light source 60 being disposed outside the displacement pickup 2, it can readily be replaced when it is found faulty. It should be noted that by using the optical fiber of a polarization retention type for the above connection, a more table detection is assured against any temperature change or bending of the optical fiber.

Note that in the displacement pickup 2, the difference in optical path length may be monitored on the basis of the result of detection of a degree of modulation when the interference lights are made to interfere with each other in the first and second optical systems 68 and 69. If the result of monitoring shows a difference in the optical path length, the optical paths are adjusted to have an equal length.

Figure 5:
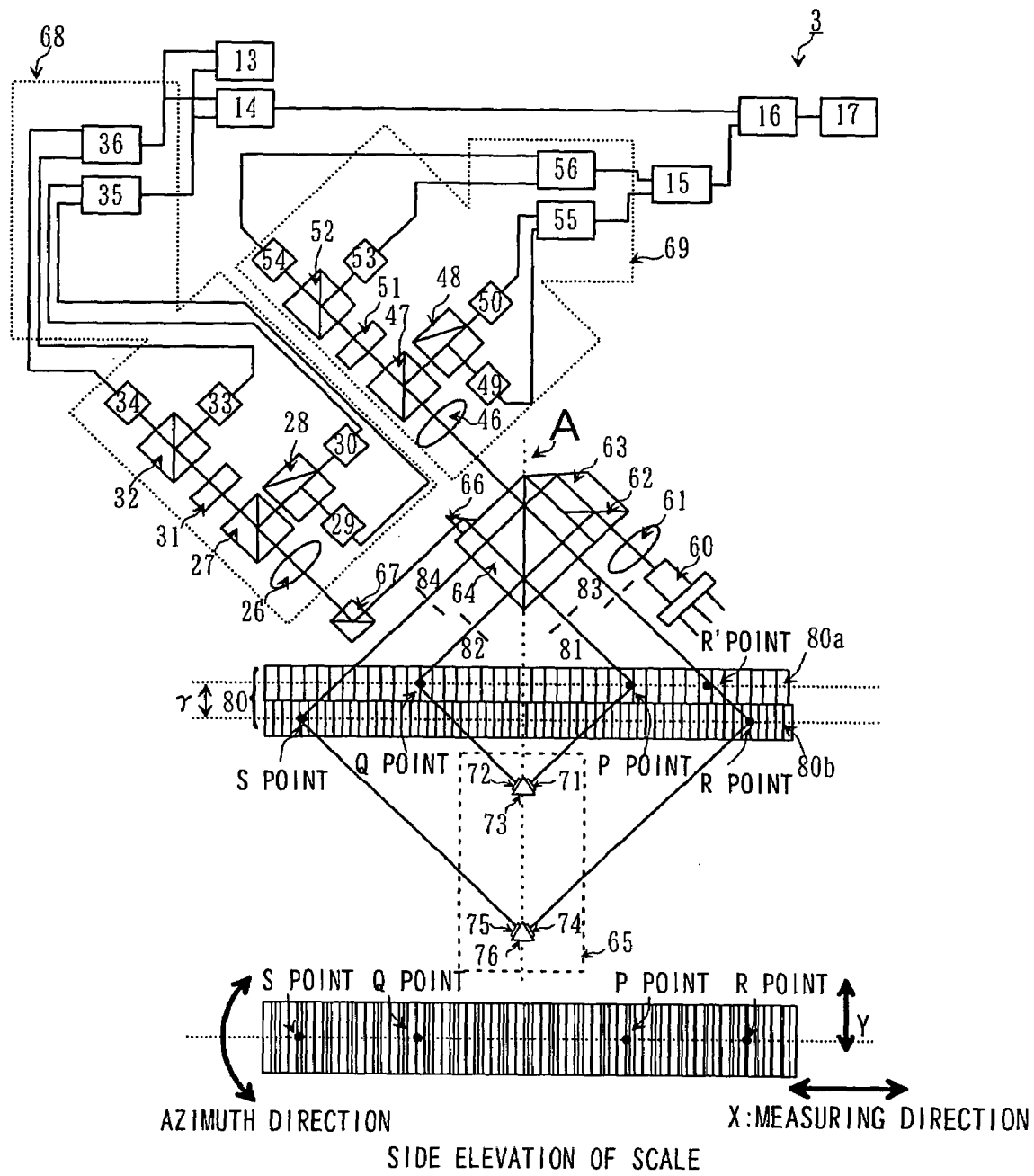
FIG. 5 is also a block diagram of a third embodiment of the displacement pickup according to the present invention.

FIG. 5 shows the third embodiment of the displacement pickup according to the present invention. The displacement pickup is generally indicated with a reference number 3. It should be noted that the same or similar elements as or to those in the aforementioned displacement pickups 1 and 2 are indicated with the same or similar reference numbers as or to those for the elements in the displacement pickups 1 and 2 and will not be described in detail.

In the displacement pickup 3, a light source and light branching unit are used in common by detection optical systems as in the displacement pickup 2. So, the same members as those in the displacement pickup 2 will be indicated with the same reference numbers for them as in the displacement pickup 2 and their function will not be described in detail. The displacement pickup 3 includes a light source 60, lens 61, beam splitter (BS) 62, first total reflection mirror 63, polarization beam splitter (PBS) 64, reflector 65, second reflection mirror 66, third total reflection mirror 67, first optical system 68, second optical system 69, scale 80, incremental signal generator 13, first phase detector 14, second phase detector 15, phase comparator 16, and a pulse signal generator 17.

The scale 80 has defined thereon the first area 80a where diffraction gratings are recorded with a pitch Λ and the second areas 80b where diffraction gratings recorded thereon with a pitch Λ+Λ/n (where n is an actual number other than zero). The first and second areas 80a and 80b are stacked one on the other like stacks. The above pitch Λ is 0.55 μm, for example. In the scale 80, points of incidence (P and Q) upon the first area 80a and those (R) and S) upon the second area 80b are laid in line with the measuring direction. It should be noted that in the displacement pickup 3, the line in which the first and second areas 80a and 80b are aligned with each other has a width γ of several tens to several hundreds μm.

Also, in the displacement pickup 3, such an adjustment is made that on the assumption that the angle of incidence upon the P point is $\theta_{1p}$, the angle of diffraction from the P point is $\theta_{2p}$, angle of incidence upon the Q point is $\theta_{1q}$ and angle of diffraction from the Q point is $\theta_{2q}$, $\theta_{1p}=\theta_{1q}$ and $\theta_{2p}=\theta_{2q}$. Further, on the assumption that the angle of incidence upon the R point is $\theta_{1r}$, the angle of diffraction from the R point is $\theta_{2r}$, angle of incidence upon the S point is $\theta_{1s}$ and angle of diffraction from the S point is $\theta_{2s}$, $\theta_{1r}=\theta_{1s}$ and $\theta_{2r}=\theta_{2s}$. Also, the diffraction order is the same at the P, Q, R and S points and the diffraction order used in the displacement pickup 3 is the first order.

Also, since the light beam diffracted at the R point in the second area 80b is also diffracted at an R' point in the first area 80a, so the light beam diffracted at the R' point comes to the optical paths, possibly causing a noise. On this account, in the displacement pickup 3, a pin hole 81 is provided in the optical path from the PBS 64 to P point, a pin hole 82 is provided in the optical path from the PBS 64 to Q point, a pin hole 83 is provided in the optical path from the PBS 64 to R point, and a pin hole 84 is provided in the optical path from the PBS 64 to S point, thereby preventing the diffracted light from incident upon the PBS 64.

Also, since the coherent light source 60, lens 61, BS 62, first total reflection mirror 63, PBS 64, reflector 65, second total reflection mirror 66, third total reflection mirror 67, first optical system 68, second optical system 69, incremental signal generator 13, first phase detector 14, second detector 15, phase comparator 16 and pulse signal generator 17 are constructed and work similarly to those included in the aforementioned displacement pickups 1 and 2, the pulse signal generator 17 can produce a pulse signal at every Λ(1+n)/4, for example, and use the pulse signal as an origin signal.

Also, the interval at which the origin signal is produced can be set arbitrarily according to a difference Λ/n between the pitch with which the diffraction gratings are recorded in the first area 80a and that with which the diffraction gratings are recorded in the second area 80b.

In displacement pickup 3 constructed as above, a beam of light emitted from the coherent light source 60 is split by the PBS 64 for incidence upon the scale 80 having defined vertically in stack thereon the first area 80a where the diffraction gratings are recorded with the pitch Λ and the second area 80b where the diffraction gratings are recorded with the pitch Λ+Λ/n (n is an actual number other than zero), so that the split beams of light are centrosymmetric with each other. The light beams diffracted at points of diffraction disposed in line with each other interfere with each other in the first and second optical systems 68 and 69. Each of the first and second phase detectors 14 and 15 detects a phase difference between the light beams interfering with each other, and the phase comparator 16 detects a difference between the phase differences, and the pulse signal generator 17 produces a pulse when the difference takes a predetermined value. Thus, since the range (length) of the measuring direction is limitless, so the scale 80 can be designed long. Also, upon detection of an incremental signal by the incremental signal generator 13, the pulse signal generator 17 can produce an accurate origin signal without being influenced by any Abbe error.

Also, in the displacement pickup 3, since the optical path through the P point in the first area 80a on the scale 80 is symmetric to the optical path through the Q point with respect to the perpendicular line A, and the optical path through the R point in the second area 80b is symmetric to the optical path through the S point with respect to the perpendicular line A, so a displacement of the scale 80 in the Y direction will not cause any travel error and a stable origin signal can always be produced. Also, in the displacement pickup 3, since the optical path for incidence upon the P point in the first area 80a on the scale 80 and that for incidence upon the Q point are adjusted to have an equal length and also the optical path for incidence upon the R point in the second area 80b and that for incidence upon the S point are adjusted to have an equal length, so a variation of the wavelength of the light source due to an external temperature will not cause any travel error and thus a stable origin signal can be produced.

Further in the displacement pickup 3, since the first and second optical systems 68 and 69 are of a grating interferometer type, so the diffraction gratings can be recorded with smaller pitches in the first and second areas 80a and 80b, respectively, defined on the scale 80. For example, when the grating pitch is 0.55 μm, the signal for detection of a phase will have a period of 0.1379 . . . μm (about 138 nm). Thus, it is possible to detect a phase difference with a high accuracy which is on the order of nanometers, for example.

Also in the displacement pickup 3, since the coherent light source 60 and PBS 64 are used in common by the first and second optical systems 68 and 69, so a variation of the light emitted from the coherent light source 60 over time or due to a change of the external temperature will not influence the symmetry of the light paths and thus a stable origin signal can be produced. Further in the displacement pickup 3, even if the scale 80 is rotated in the azimuth direction, the position of an origin will not be drifted by a COS error.

Also, the coherent light source 60 and lens 61, the second lens 26 and BS 27, and the second lens 46 and BS 47, may be connected to each other with optical fibers, respectively.

Alternatively, instead of making a connection between the second lens 26 and BS 27 and between the second lens 46 and BS 47 with the optical fibers, respectively, the second PBS 28 and first photoelectric transducer 29, the second PBS 28 and second photoelectric transducer 30, the third PBS 32 and third photoelectric transducer 33, the third PBS 32 and fourth photoelectric transducer 34, the second PBS 48 and first photoelectric transducer 49, the second PBS 48 and second photoelectric transducer 50, the third PBS 52 and third photoelectric transducer 53, and the third PBS 52 and fourth photoelectric transducer 54, may be connected to each other with the optical fibers, respectively.

Note that to condense the output light from the second PBS 28 for supply to the optical fiber, a condenser lens may be disposed between the second PBS 28 and first photoelectric transducers 29 and between the second PBS 28 and second photoelectric transducer 30, respectively; to condense the output light from the third PBS 32 for supply to the optical fiber, a condenser lens may be disposed between the third PBS 32 and third and third photoelectric transducer 33 and between the third PBS 32 and fourth photoelectric transducer 34, respectively; to condense the light output from the second PBS 48 for supply to the optical fiber, a condenser lens be disposed between the second PBS 48 and first photoelectric transducer 49 and between the second PBS 48 and second photoelectric transducer 50, respectively; and to condense the output light from the third PBS 52 for supply to the optical fiber, a condenser lens be disposed between the third PBS 52 and third photoelectric transducer 53 and between the third PBS 52 and fourth photoelectric transducer 54, respectively.

In the aforementioned construction of the displacement pickup 3, the scale 80 can be disposed apart from any heat source, so that the phase detection can be done more stably. Also, the wavelength of beams of light emitted from the coherent light source 60 can be fixed to a constant one through a temperature control. Further, with the coherent light source 60 disposed outside the displacement pickup 3, it can readily be replaced when it is found faulty. It should be noted that by using the optical fiber of a polarization retention type for the above connection, a more table detection is assured against any temperature change or bending of the optical fiber.

Note that in the displacement pickup 3, the difference in optical path length may be monitored on the basis of the result of detection of a degree of modulation when the interference lights are made to interfere with each other in the first and second optical systems 68 and 69. If the result of monitoring shows a difference in the optical path length, the optical paths are adjusted to have an equal length.

The displacement pickups 1, 2 and 3 having been described in the foregoing use the scales having linear, transparent diffraction gratings recorded thereon, but the diffraction gratings may be any of the radial ones as used in a rotary encoder or reflective ones, whichever would be more appropriate.

Also in each of the displacement pickups 1, 2 and 3, the scale is displaceable. However, the optical systems may be adapted to be displaceable.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

As having been described in the foregoing, the displacement pickup according to the present invention includes a scale having defined thereon a first area where positional information is recorded with a predetermined pitch and a second area where position information is recorded with a pitch different from that in the first area. The first and second areas are formed to be movable an equal distance in the same measuring direction and the scale itself is displaceable. With such a scale, positions for reading the positional information from the first and second areas are in line with each other. Thus, an accurate origin signal can be produced without being influenced by any Abbe error.

What is claimed is:

1. A displacement pickup comprising:
a first reading means for emitting a beam of light to diffraction gratings and reading a return component of light from the diffraction gratings;
a first phase detecting means for detecting a first phase on the basis of the return component of light detected by the first reading means;
a second reading means for emitting a beam of light to diffraction gratings and reading a return component of light from the diffraction gratings;
a second phase detecting means for detecting a second phase on the basis of the return component of light detected by the second reading means;
a phase comparing means for making a comparison between the first and second phases;
an origin signal generating means for producing an origin signal on the basis of the result of comparison from the phase comparing means; and
a scale having defined thereon a first area in which diffraction gratings are recorded with a predetermined pitch and from which the return component of light from the diffraction gratings is read by the first reading means, and a second area in which diffraction gratings are recorded at a predetermined pitch different from the diffraction grating pitch in the first area and from which the return component of light from the diffraction gratings is read by the second reading means, the scale being displaceable in a direction in which the return component of light from the diffraction gratings is read by the first and second reading means,
the first and second areas being defined on the scale to be displaceable an equal distance in the same measuring direction; and
a position for reading, by the first reading means, the positional information recorded in the first area and a position for reading, by the second reading means, the positional information recorded in the second area being in line with each other in the measuring direction.

2. The apparatus as set forth in claim 1, wherein the scale has a first area defined on one end thereof in a direction in which the positional information is read by the first and second reading means, and a second area defined at the other end.

3. The apparatus as set forth in claim 1, wherein the scale has second areas defined thereon across a first area.

4. The apparatus as set forth in claim 1, wherein the scale has first and second areas defined in a stack perpendicular to a direction in which the positional information is read by the first and second reading means.

5. The apparatus as set forth in claim 1, wherein the origin signal generating means includes a setting means for setting an arbitrary value so that the origin signal generating means will produce an origin signal when a difference between the first and second phases takes the arbitrary value.

6. The apparatus as set forth in claim 1, wherein the origin signal generating means produces an origin signal only when a difference between the first and second phases is zero.

7. The apparatus as set forth in claim 1, wherein the origin signal generating means produces an origin signal when a difference between the first and second phases has taken a set value a predetermined number of times.

8. The apparatus as set forth in claim 1, further comprising:
a selecting means for selecting either the first or second phase; and
a setting means for setting an arbitrary value so that the origin signal generating means will produce an origin signal when any of the phases selected by the selecting means takes the arbitrary value after a difference between the first and second phases takes a set arbitrary value.

9. The apparatus as set forth in claim 8, wherein the origin signal generating means produces an origin signal when the phase selected by the selecting means takes a value set by the setting means in a position after the difference between the first and second phases takes a set value and then the phase difference takes the set value which appears again in a position a predetermined distance apart from the above position.

10. The apparatus as set forth in claim 9, wherein:
the predetermined distance is $(2n+1)\Lambda/2$ where n is an integer larger than zero and $\Lambda$ is a pitch with which the diffraction gratings are recorded in the first area in case the first phase difference is selected by the selecting means, while being a pitch with which the diffraction gratings are recorded in the second area in case the second phase difference is selected by the selecting means.

11. The apparatus as set forth in claim 1, wherein:
the positional information recorded in the first and second areas defined on the scale includes transparent or reflective diffraction gratings;
the first reading means includes a first light source, a first beam splitting means for dividing a light beam from the first light source by two, and a first optical system in which the two divisional light beams are diffracted by the diffraction gratings and the two diffracted light beams are superposed on each other to provide an electric signal; and
the second reading means includes a second light source, a second beam splitting means for dividing a light beam from the second light source by two, and a second optical system in which the two divisional light beams are diffracted by the diffraction gratings and the two diffracted light beams are superposed on each other to provide an electric signal.

12. The apparatus as set forth in claim 11, wherein:
the first reading means further includes a first reflector to reflect the two divisional light beams diffracted by the diffraction gratings back to the diffraction gratings;
the second reading means further includes a second reflector to reflect the two divisional light beams diffracted by the diffraction gratings back to the diffraction gratings;
the first optical system superposes the diffracted light beams having been diffracted by the diffraction gratings several times; and
the second optical system superposes the diffracted light beams having been diffracted by the diffraction gratings several times.

13. The apparatus as set forth in claim 12, wherein the coherence lengths of the first and second coherent light sources is within 200 μm.

14. The apparatus as set forth in claim 12, further comprising:
a first modulation degree detecting means for detecting a degree of modulation when the two diffracted light beams are caused to interfere with each other in the first optical system;
a first monitoring means for monitoring the change of optical path length difference on the basis of the result of detection from the first modulation degree detecting means;
a second modulation degree detecting means for detecting a degree of modulation when the two diffracted light beams are caused to interfere with each other in the second optical system; and
a second monitoring means for monitoring the change of optical path length difference on the basis of the result of detection from the second modulation degree detecting means.

15. The apparatus as set forth in claim 11, wherein:
the scale is a one having a first area defined thereon and second areas defined thereon on either side of the first area or a one having a first area and second area defined in a stacker perpendicular first and second light sources to a direction in which positional information is read by the first and second reading means; and
the optical paths along which the diffracted light beams superposed by the first optical system travel are disposed centrosymmetrically with each other with respect to a direction in which the scale is displaced.

16. The apparatus as set forth in claim 11, wherein:
the first optical system further includes a first adjuster for a maximum ratio of modulation; and
the second optical system further includes a second adjuster for a maximum ratio of modulation.

17. The apparatus as set forth in claim 11, wherein one light source is used in common as the first and second light sources.

18. The apparatus as set forth in claim 11, wherein:
the scale is a one having a first area defined thereon and second areas defined thereon on either side of the first area or a one having a first area and second area defined in a stack perpendicular to a direction in which positional information is read by the first and second reading means;
one light source is used in common as the first and second light sources; and
one beam splitter is used in common as the first and second beam splitters.

19. The apparatus as set forth in claim 11, wherein
the first light source is connected to the first beam splitter with an optical fiber through which the light beam is guided for incidence upon the first beam splitter;
the first beam splitter is connected to the first optical system with an optical fiber through which the light beam is guided for incidence upon the first optical system;
the second light source is connected to the second beam splitter with an optical fiber through which the light beam is guided for incidence upon the second beam splitter; and
the second beam splitter is connected to the second optical system with an optical fiber through which the light beam is guided for incidence upon the second optical system.

20. The apparatus as set forth in claim 19, wherein the first and second light sources, and the first and second optical systems are provided outside the apparatus.

21. The apparatus as set forth in claim 11, wherein
the first light source is connected to the first beam splitter with an optical fiber through which the light beam is guided for incidence upon the first beam splitter;
a photodetector in the first optical system is connected to each of the other components of the first optical system with an optical fiber through which the light beam is guided for incidence upon the other components;
the second light source is connected to the second beam splitter with an optical fiber through which the light beam is guided for incidence upon the second beam splitter; and
a photodetector in the second optical system is connected to each of the other components of the second optical system with an optical fiber through which the light beam is guided for incidence upon the other components.

22. The apparatus as set forth in claim 21, wherein the first and second light sources, and the photodetectors in the first and second optical systems are provided outside the apparatus.

* * * * *